L. LYNDON.
STORAGE BATTERY ASSEMBLY.
APPLICATION FILED APR. 30, 1919.
1,364,390.
Patented Jan. 4, 1921.
3 SHEETS—SHEET 2.
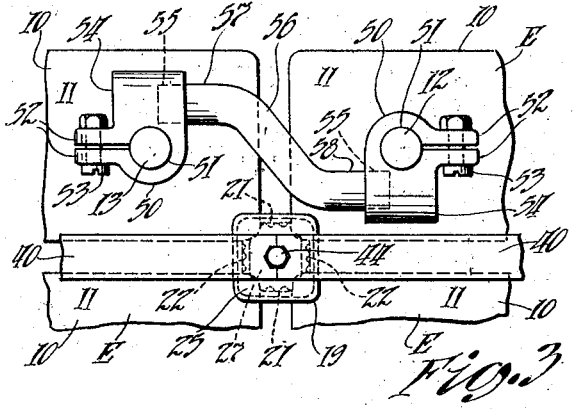
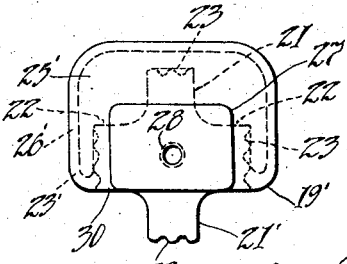
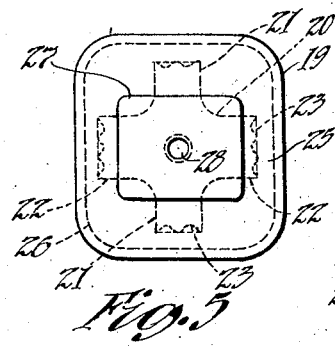
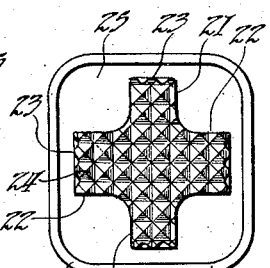
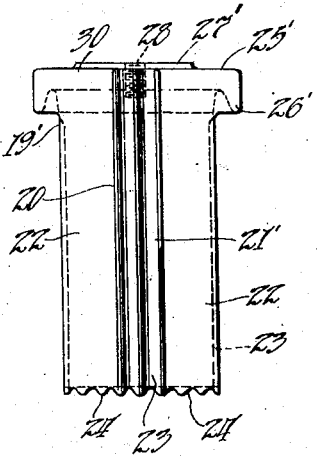
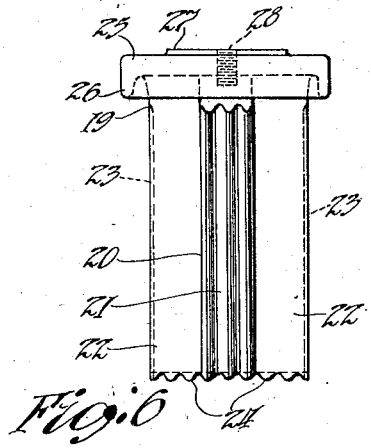
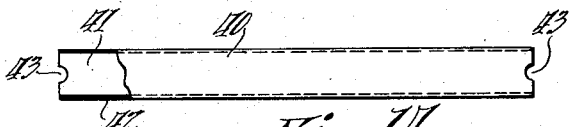
Witnesses:
H. J. Fisher
William A. Hardy
Inventor:
Lamar Lyndon
By Delos Holden
his Atty.

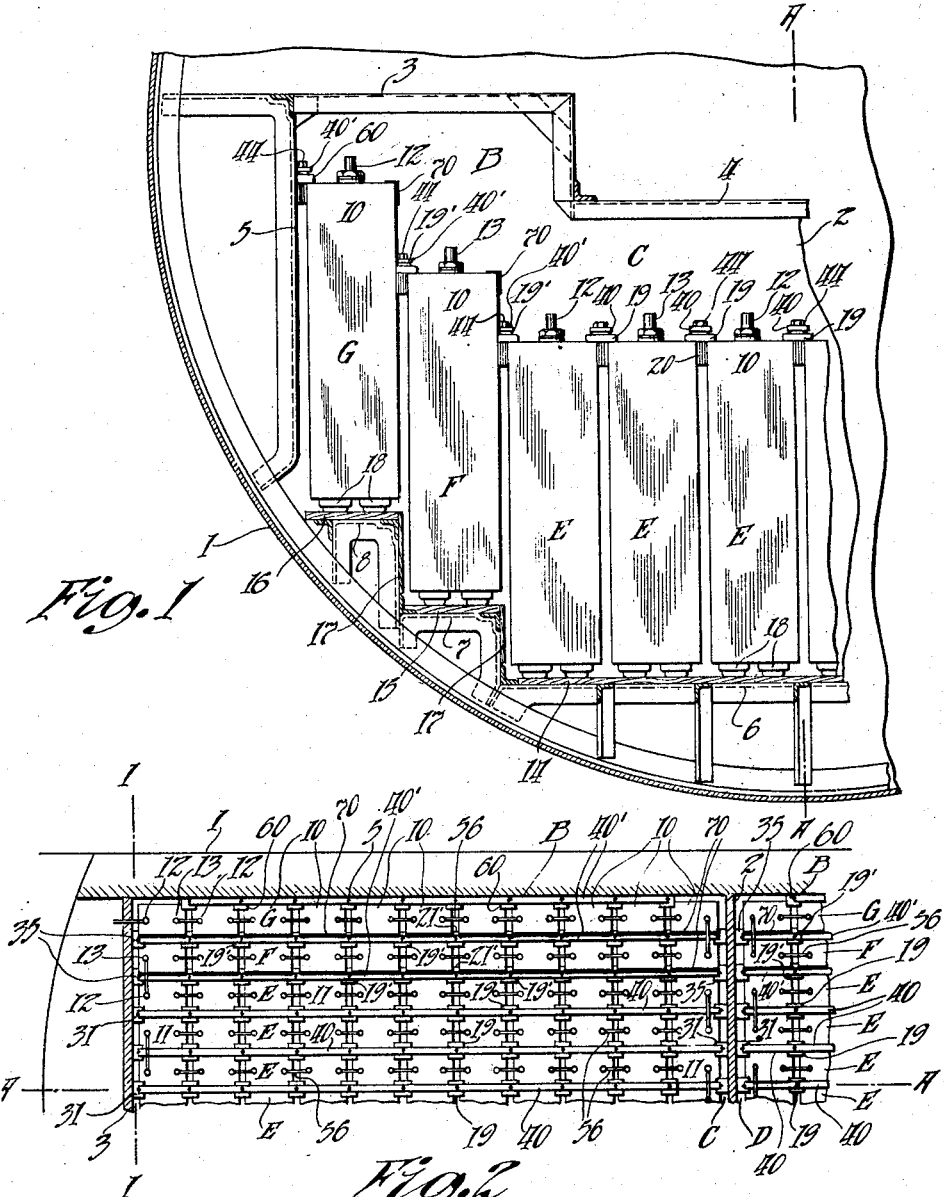

L. LYNDON.
STORAGE BATTERY ASSEMBLY.
APPLICATION FILED APR. 30, 1919.

1,364,390.

Patented Jan. 4, 1921.
3 SHEETS—SHEET 3.

Witnesses:
N. L. Fisher
William A. Hardy

Inventor:
Lamar Lyndon
By Delos Holden
his Atty.

UNITED STATES PATENT OFFICE.

LAMAR LYNDON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE-BATTERY ASSEMBLY.

1,364,390.   Specification of Letters Patent.   Patented Jan. 4, 1921.

Application filed April 30, 1919. Serial No. 293,792.

*To all whom it may concern:*

Be it known that I, LAMAR LYNDON, a citizen of the United States, and a resident of West Orange, Essex county, New Jersey, have invented certain new and useful Improvements in Storage-Battery Assemblies, of which the following is a description.

My invention relates to storage battery assemblies and more particularly to an improved assembly especially designed for storage battery cells of great size and considerable weight, such as those of the Edison submarine type in which an alkaline electrolyte is employed and the electrolyte and battery elements or plates are disposed in a large metallic receptacle or container, although it is to be understood that my invention may be effectively utilized with other types of batteries.

One of the principal objects of my invention is to provide an improved arrangement which is especially designed to enable a group or battery of storage battery cells to be quickly installed to the best advantage in a restricted space, such as the battery tank or compartment of a submarine boat.

Another object of my invention resides in a construction whereby any number of battery cells in an assembly are securely held in proper relative position and rigidly maintained in the compartment in which they are positioned against movement with respect thereto and with respect to each other, and whereby the individual cells are spaced and insulated from and kept out of contact with the walls of such compartment and each other, and are guarded from contact with other conducting bodies.

My invention further consists of an improved arrangement of cells in the compartment therefor whereby adequate and intercommunicating spaces are provided on all sides of the cell so as to insure easy ventilation and cooling thereof, and in the provision of means for effectively preventing short-circuiting of any of the cells by moisture or other matter which may be present or which may fall into the compartment.

Other objects and features of my invention will be hereinafter more fully described and claimed.

For a clearer understanding of my invention, attention is directed to the drawings accompanying and forming a part of this specification, in which:

Figure 1 is a transverse sectional view, partly broken away, taken on a plane indicated by line 1—1 of Fig. 2, through the hull of a submarine boat showing a storage battery assembly therein in accordance with my invention, the insulators employed at the adjacent end of the assembly being omitted. The construction and arrangement to the right of a vertical central plane longitudinally of the boat indicated by the line A—A, is the same as that shown at the left thereof and is therefore mostly omitted in this figure.

Fig. 2 is a fragmental plan view, shown somewhat diagrammatically, of the construction and arrangement shown in Fig. 1, the cover of the battery compartment being omitted. Only a few of the cells in the group in the right-hand chamber of the battery compartment are shown in this figure, as the arrangement of the cells in this group is similar to that of the group of cells shown in the left-hand chamber of the battery compartment.

Fig. 3 is an enlarged fragmental plan view showing the means for connecting poles of adjacent cells in my proposed assembly, and the means for maintaining adjacent cells in spaced relation and for preventing material entering the space between adjacent rows of cells.

Fig. 4 is a view in elevation of one element of the means employed for electrically connecting adjacent cells.

Fig. 5 is an enlarged top plan view of one form of insulator employed in my battery assembly for maintaining adjacent cells thereof in spaced relation.

Fig. 6 is a view in elevation of the insulator shown in Fig. 5.

Fig. 7 is a bottom plan view of the insulator shown in Fig. 5.

Fig. 8 is an enlarged top plan view of another form of insulator employed in my battery assembly for maintaining adjacent cells thereof in spaced relation.

Fig. 9 is a view in elevation of the insulator shown in Fig. 8.

Fig. 14 is an enlarged view in elevation, partly broken away, of one of the insulating strips for preventing material entering the space between adjacent longitudinally extending rows of cells of the battery assembly.

Figure 11:
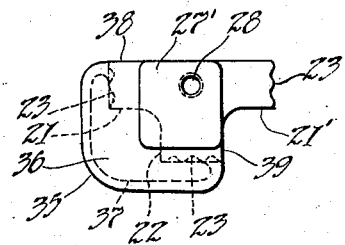
Figs. 11 and 12 are views similar to Figs. 8 and 9 respectively, showing the form of insulators employed in maintaining the end cells of the adjacent longitudinally extending rows of cells which are supported at different levels in my battery assembly, spaced and insulated from each other and from the adjacent walls or partitions of the battery compartment.

Referring to the drawing, reference character 1 represents the hull of a submarine boat in the lower portion of which is provided the usual battery compartment B extending longitudinally of the boat. The battery compartment B is divided longitudinally thereof into two chambers C and D as by means of a transverse partition or ventilating baffle 2. A transverse wall or ventilating baffle 3 is also provided adjacent each end of the battery compartment B, only one of such walls being shown. In each of the chambers C and D is disposed a group or battery of storage battery cells, with the cells of each group connected in series. The battery compartment B is formed with a top or cover 3' having a central depressed portion 4 and with opposite vertical side walls, only one of which is shown at 5.

It has heretofore been customary to provide the battery compartment of a submarine boat with a continuous flat floor or bottom and mount the cells of each group or battery of cells thereon in parallel rows extending longitudinally of the compartment. Consequently but a comparatively few of such rows of cells could be mounted in the battery compartment as it was impossible because of the height of these cells and the shape of the hull of the boat, to utilize more than a comparatively small part of the space transversely of the hull of the boat. In order to overcome this and to make the best use of the space available, I form the bottom or floor of battery compartment B in sections disposed at different levels, on each of which sections one or more longitudinally extending rows of cells of the battery in each of the chambers C and D are supported. As shown I form the bottom of the battery compartment B with a comparatively wide central section 6 close to the bottom of the hull 1, and stepped-up sections 7 and 8 at either side of the central section 6. In the assembly illustrated a plurality of rows E of cells are supported on the lowermost central floor section 6, one row F on each intermediate floor section 7 and one row G on each uppermost floor section 8. The construction and arrangement just described can, of course, be varied so as to best suit the space which may be available. The longitudinally extending rows of cells E, F and G are arranged parallel to and spaced from each other. Each of the cells is preferably of the Edison submarine type and comprises a large substantially rectangular conducting container 10 in which the battery elements, not shown, are disposed, having the cover 11 and the bottom (not shown) welded to the side walls thereof in the usual manner. Each of these cells is provided with a positive pole 12 and a negative pole 13 extending through and above the top 11 thereof. The cells in each of the rows E, F and G are arranged in spaced relation to each other and the corresponding cells in said rows are in alinement and constitute rows or series of cells extending transversely of the battery compartment at right angles to the rows E, F and G. It will therefore be seen that the spaces between corresponding pairs of adjacent cells in rows E, F and G will be in alinement and will intersect the spaces between the rows E, F and G at right angles thereto.

The floor sections 6, 7 and 8 are respectively provided with upper surface layers or coverings 14, 15 and 16 formed of insulating material, such as wood, and the vertical wall sections between the pairs of adjacent floor sections 6, 7 and 7, 8 are also each provided with a surface layer 17 of insulating material, such as wood.

Each of the cells is supported on the respective floor section 6, 7, or 8 and spaced and insulated therefrom by means of petticoat insulators 18, preferably of porcelain and preferably similar to the supporting insulators disclosed in a copending application of M. R. Hutchison and C. W. Norton, Serial No. 143,493, filed January 20, 1917, and entitled Battery supporting devices.

The cells in each group or battery are maintained spaced and insulated from each other and from the walls of the respective chamber C or D of the battery compartment B, and are also rigidly held against movement relative to each other and to the walls of the respective chamber by means of a plurality of insulators 19, 19', 31, 35 and 60, preferably formed of porcelain, the arrangement and construction of which will now be described.

One of the insulators 19 is disposed at each of the intersections of the spaces between the rows of cells E, the tops of which are at the same level, with the spaces between the transversely extending rows of cells. Each of these insulators 19, referring to Figs. 5 to 7, consists of an elongated body portion 20 provided with two pairs of longitudinally extending projections 21, 21 and 22, 22; each of said pairs being in alinement and at right angles to the other pair. Each of the said projections is substantially rectangular in transverse section, and the body portion 20 will therefore be cross-shaped in transverse section. The outer face of each of the projections formed on the body portion 20 is preferably fluted or grooved longitudinally thereof as indicated at 23, and the entire bottom or lower face of said body portion is preferably formed with two series of spaced grooves intersecting at right angles whereby it is provided with closely adjacent substantially pyramidical projections 24. The insulator has a substantially rectangular head 25 preferably formed integrally with the body portion 20, extending beyond or overhanging the projections 21, 21 and 22, 22 of said body portion, and having a depending peripheral petticoat 26. The head 25 is also provided with a flat central substantially rectangular upstanding portion 27 and a central vertical threaded socket 28 the purpose of which will be presently described. As clearly shown in Figs. 1 and 3, body portion 20 of the insulator 19 at each of said intersecting points, extends downwardly between the four adjacent cells, with the projections 21, 21 respectively extending into the spaces between the two pairs of adjacent cells in the two adjacent rows E, E, and with the projections 22, 22 thereof respectively extending into the spaces between the two pairs of adjacent cells in the two adjacent transversely extending rows of cells. The body portion 20 is rounded between each pair of adjacent projections so as to closely fit the adjacent rounded corner portions of the four adjacent cells, and the projections are of such width that their side faces will respectively closely engage the adjacent walls of the cells. As the spaces between the rows of cells E, F, and G are preferably slightly wider than the spaces between the transversely extending rows of cells, the projections 22, 22 will obviously be somewhat wider than the projections 21, 21. The member 19 is supported in the position shown from the four adjacent cells 10 by means of its head 25, the petticoat 26 of which engages with the tops 11 of such cells.

The insulators 19' are respectively disposed at the intersections of the spaces between the pairs of adjacent rows of cells E, F and F, G with the spaces between the transversely extending rows of cells. The insulators 19' are each of the same construction as the insulators 19 except that, as shown in Figs. 8 and 9, one of the projections 21' of the body portion thereof extends to the top of the head 25', and the latter is formed with one edge 30 thereof flush with the side faces of the projections 22, 22 which are adjacent such projection 21' and with the petticoat 26' thereof extending along only its other three edges which overhang the corresponding projections 21, and 22, 22. The tops of the cells in rows F and G being at a higher level than the tops of the cells in the respective adjacent rows E and F, the insulator 19' at each of the intersections of the spaces between the pairs of adjacent rows E, F and F, G with the spaces between the transverse rows of cells, is arranged so that its head 25' overhangs the two adjacent cells in the row E or F at the lower level with the petticoat 26' thereof engaging the tops 11 of such cells and with the edge 30 thereof engaging the adjacent walls of the two adjacent cells in the row F or G at the higher level, and so that the projections 21 and 21' of the body portion thereof respectively extend into and closely fit the spaces between the two pairs of adjacent cells in the adjacent rows E and F or F and G and the projections 22, 22 respectively extend into and closely fit the spaces between the two pairs of adjacent cells in the adjacent transverse rows.

Figure 10:
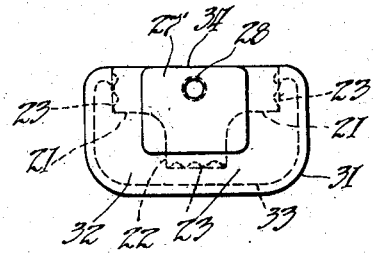
Fig. 10 is an enlarged plan view showing the form of insulators employed in maintaining the end cells of the adjacent longitudinally extending rows of cells which are supported at the same level in the battery assembly, spaced and insulated from each other and from the adjacent walls or partitions of the battery compartment.

The spaces between the end transverse rows of cells in each of the battery chambers and the adjacent transverse walls or partitions 2 and 3 are preferably of the same width as the spaces between the adjacent transverse rows of cells, and at each of the intersections thereof with the spaces between the adjacent rows E, E is disposed an insulator 31 such as shown in Fig. 10. The insulators 31 are each similar in construction to the insulators 19 shown in Figs. 5 to 7, except that the elongated body portion thereof is T-shaped in cross-section, being provided with but a single projection 22, and the head 32 thereof is formed with one edge 34 flush with the face of the body portion and the adjacent side faces of the projections 21, 21 which are in the same plane, and with its petticoat 33 extending along only its other three edges which overhang the corresponding projections 21, 21, and 22. At each of the said intersections the respective insulator 31 is disposed with its head 32 closely engaging the adjacent partition or wall 2 or 3 and extending over the adjacent end cells of the two adjacent rows E, E so that its petticoat 33 engages the tops 11 of such cells, with the projections 21, 21 respectively extending into and closely fitting the spaces between such cells and said wall or partition, and with the projection 22 extending into and closely fitting the space between said cells.

Figure 12:
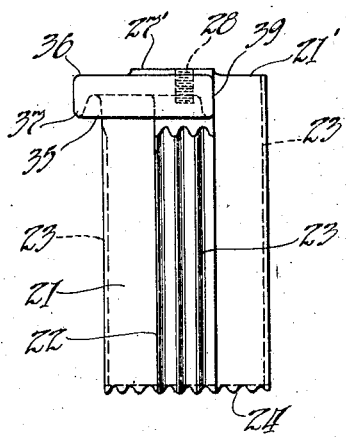

At the intersection of each of the spaces between the pairs of adjacent rows of cells E, F and F, G with the spaces between the end transverse rows of cells in each of chambers C and D and the adjacent walls or partitions 2 and 3, is disposed an insulator 35 such as shown in Figs. 11 and 12. The insulators 35 are each similar in construction to the insulators 19' shown in Figs. 8 and 9, except that the elongated body portion thereof is T-shaped in cross-section, being provided with but a single projection 22, and the head 36 thereof is formed with a petticoat 37 extending along only two of its edges which overhang the two corresponding projections 21 and 22, with another edge 38 flush with the face of the body portion and the adjacent side faces of the projections 21, 21' which are in the same plane, and with its remaining edge 39 flush with another face of the body portion and the side face of the projection 22 which is adjacent the projection 21'. Each of the insulators 35 is arranged with its head 36 closely engaging the adjacent partition or wall 2 or 3 and extending over the lower one of the adjacent end cells of the two adjacent rows E, F or F, G and so that the petticoat 37 engages the top 11 of such cell, with the projections 21, 21 respectively extending into and closely fitting the spaces between the said cells and said wall or partition, and with the projection 22 extending into and closely fitting the space between said cells.

Figure 13:
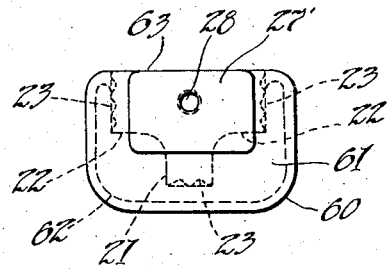
Fig. 13 is an enlarged plan view showing the form of insulators employed in maintaining the cells in the outermost of the longitudinally extending rows of cells in the battery assembly, spaced and insulated from each other and from the adjacent side walls of the battery compartment.

The insulators 60 shown in Fig. 13 are respectively disposed at the intersections of the spaces between the outermost rows G and the adjacent side walls 5 of the battery compartment with the spaces between the transverse rows of cells. The insulators 60 are each similar to the insulators 19 shown in Figs. 5 to 7, except that the body portion is T-shaped in cross-section, being formed with but one projection 21, and the head 61 has one edge 63 flush with one face of said body portion and with the adjacent side faces of the projections 22, 22 which are in the same plane, and its petticoat 62 extending along the other three edges thereof. The insulator 60 at each of said intersecting points is positioned with the head 61 thereof engaging the adjacent side wall 5 at its edge 63, and extending over the two adjacent cells of the adjacent row G with its petticoat 62 engaging the tops of said cells, with the projection 21 extending into and closely fitting the space between said cells, and with the projections 22 respectively extending into and closely fitting the spaces between said cells and the adjacent wall 5.

The insulators 19, 19', 31, 35 and 60 constructed and arranged as described above, serve to maintain the cells in each of the chambers C and D of the battery compartment B spaced and insulated from each other and from the walls of the chamber, and also prevent movement of the cells relative to each other and to the battery chamber in which they are disposed. By reason of the length of the body portions of these insulators, they project downwardly between the adjacent cells an amount sufficient to effectively prevent any relative movement of the cells at the bottom or lower ends thereof. The longitudinally extending grooves or flutings 23 on the outer faces of the projections formed on the body portions of the insulators, considerably increase the effective width of such faces and render it much more difficult for moisture to creep thereacross, the liability of short-circuiting any of the cells by reason of moisture bridging the space between any of the adjacent cells or between any cell and the adjacent wall of the respective battery chamber being thus reduced to a minimum. Moreover, the moisture will tend to run down the grooves 23 to the bottom of the insulators and not creep over the ribs therebetween. The pyramidical projections 24 on the bottom of each insulator also increase the effective width and length of said bottom and act in a similar way to reduce the liability of short circuits being established by moisture creeping thereacross. Furthermore, any moisture present on the bottoms of the insulators will tend to run down the sides of the projections 24 and drop off the ends thereof.

Should a metallic tool or other conducting body fall or enter into the space between any two adjacent rows of the longitudinally extending rows of cells E, F and G, a short circuit would probably result. To guard against this, insulating strips 40 are positioned directly over the spaces between each pair of adjacent rows E, E, and insulating strips 40' are positioned directly over the spaces between the pairs of adjacent rows E, F and F, G and also directly over the spaces between the outer rows of cells G and the adjacent walls 5 of the battery compartment B. Each of the strips 40 (see Fig. 14) preferably consists of a thin metal stiffening strip 41 having a covering 42 of insulating material, preferably semi-hard rubber, suitably secured thereto, and is provided at each end with a semi-circular notch 43 of the same radius as the threaded sockets 28 in the insulators 19. The strips 40 are respectively secured at their end portions to the pairs of adjacent insulators 19, 31, by means of bolts 44 threaded into the sockets 28. The shanks of the bolts 44 engage the notches 43 in the ends of the strips 40 and the heads of the bolts, when the latter are screwed up tight, securely clamp the end portions of the strips against the respective upstanding portions 27 and 27' of the said insulators. The strips 40 are thus held in position over the spaces between the rows of cells E and a slight distance above the tops of the cells. As shown in Fig. 3, each of the strips 40 is somewhat wider than the space between the rows E so that it will extend over the tops of the adjacent cells for a slight distance. The strips 40' are of practically the same construction as the strips 40 and are respectively secured in position to the pairs of adjacent insulators 19', 35 and 60 against the portions 27' thereof, in the same manner as the strips 40 are secured to the insulators 19 and 31. The strips 40', however, are slightly less in width than strips 40, for the strips in the outermost series engage at one side edge with the adjacent wall 5, the strips over the space between the adjacent rows F and G engage at one side edge with the adjacent walls of the cells in row G, and the strips over the space between the pair of adjacent rows of cells E and F engage at one edge with the adjacent walls of the cells in row F. No short circuit would result if a conducting body fell between adjacent cells in any of the rows E, F and G with the cells of each group or battery connected in series as shown, and it is therefore unnecessary to provide means, such as the strips 40 and 40' over the spaces between the transversely extending rows of cells to prevent conducting bodies entering such spaces.

The cells of each battery are connected in series, preferably as follows: On each of the two adjacent poles 12 and 13 of unlike polarity of each pair of adjacent cells is mounted a connector member 50. Each connector member 50 comprises a split, slightly resilient portion having a cylindrical opening 51 therethrough and a pair of opposed lugs 52, 52 at the sides of the split having a bolt 53 extending therethrough, whereby the connector member may be rigidly secured to the respective pole 12 or 13 which is engaged with the opening 51, and a projecting portion or lug 54 having a socket 55 extending inwardly from one face thereof and at right angles to the opening 51. The two connector members 50 are mounted on said poles with the portions or lugs 54 thereof parallel and extending in opposite directions from the respective poles and so that the respective sockets 55 will be opposed but offset from each other, as shown in Fig. 3; and said members are electrically connected preferably by means of a flexible conductor 56 provided with end portions 57 and 58 which respectively engage the sockets 55 of the members with a tight fit.

Each of the cells in each of the rows F and G is preferably provided at the top corner portion thereof which is adjacent the corresponding cell in the adjacent lower row E or F, with a covering or layer 70 of insulating material, preferably semi-hard rubber, suitably secured thereto. Consequently, the danger of short circuits being established by a conducting body, for example, a wrench or steel bar, engaging any such corner portion and the conducting container or a pole of a cell in the adjacent lower row is practically eliminated.

While I have described the preferred construction and arrangement of my improved assembly, it is to be understood that numerous changes and modifications may be made therein without departure from the spirit of my invention or the scope of the appended claims.

Having now described my invention, what I claim as new and desire to protect by Letters Patent is as follows:

1. In a storage battery assembly, a group of battery cells arranged in a plurality of adjacent parallel spaced rows with the cells in each row in spaced relation, means for maintaining all said cells in spaced relation, comprising a plurality of insulating members respectively disposed at the intersections of the spaces between said rows with the spaces between the cells in each row, the insulating member at each such intersecting point having engagement with the four adjacent cells, and insulating strips carried by certain of said insulating members located in the space between two of said adjacent rows, in a position directly over and covering said space, substantially as described.

2. In a storage battery assembly, a group of battery cells arranged in a plurality of adjacent parallel spaced rows with the cells in each row in spaced relation, and means for maintaining the cells in such spaced relation, comprising a plurality of insulating members respectively having portions extending into the spaces between corresponding pairs of adjacent cells in two adjacent rows of cells and into the space between said two rows, said insulating members each having a head provided with a peripheral depending petticoat engaging a top portion of at least one of the adjacent cells whereby it is supported by the latter, substantially as described.

3. The combination of a battery compartment, a row of cells disposed therein and extending thereacross, some of the adjacent cells being supported with their tops at different levels, and means for maintaining said cells in spaced relation, comprising insulating members respectively disposed between adjacent cells, each of the insulating members disposed between two adjacent cells having their tops at different levels, being supported from the top of the cell at the lower level, substantially as described.

4. The combination of a battery compartment, a row of cells disposed therein and extending thereacross, some of the adjacent cells being supported with their tops at different levels, and some of the adjacent cells being supported with their tops at the same level, and means for maintaining said cells in spaced relation, comprising insulating members respectively disposed between adjacent cells, each of the insulating members disposed between two adjacent cells having their tops at different levels being supported from the top of the cell at the lower level, and each of the insulating members disposed between two adjacent cells having their tops at the same level being supported from the tops of both such cells, substantially as described.

5. In combination, a battery compartment, the bottom of said compartment being formed in sections at different levels, a group of cells disposed in said compartment and arranged in a plurality of adjacent parallel spaced rows with the cells in each row in spaced relation, one or more of said rows of cells being supported on each of said bottom sections in spaced and insulated relation thereto, and means for maintaining all said cells in fixed spaced relation to each other and to the walls of said compartment, comprising a plurality of insulating members respectively disposed at the intersections of the spaces between said rows with the spaces between the cells in each row, the insulating member at each intersecting point having engagement with the four adjacent cells, and the insulating members disposed between adjacent rows of cells supported on bottom sections of the compartment which are at different levels being supported only from the tops of the cells supported on the lower section, and means for maintaining the cells of the outermost rows of cells spaced and insulated from adjacent walls of the compartment, substantially as described.

6. An insulator for separating storage battery cells, comprising a body portion formed with longitudinally extending projections, and a head provided with a peripheral petticoat overhanging at least one of said projections, substantially as described.

7. An insulator for separating storage battery cells, comprising a body portion formed with longitudinally extending projections, the outer faces of said projections being fluted longitudinally thereof, and a head overhanging at least one of said projections, substantially as described.

8. An insulator for separating storage battery cells, comprising a body portion formed with longitudinally extending projections, the bottom face of the body portion being fluted or grooved, and a head provided with a peripheral petticoat overhanging projections of said body portion, substantially as described.

9. An insulator for separating storage battery cells, comprising an elongated body portion formed with a longitudinally extending projection, the outer face of said projection being fluted longitudinally thereof, substantially as described.

10. An insulator for separating storage battery cells, comprising an elongated body portion the bottom face of which is fluted or grooved, substantially as described.

11. An insulator for separating storage battery cells having a body portion adapted to extend between adjacent cells, the bottom face of said body portion being provided with intersecting grooves, substantially as described.

12. An insulator for separating storage battery cells having a body portion adapted to extend between adjacent cells, the bottom face of said body portion being provided with spaced projections, substantially as described.

This specification signed this 22nd day of April, 1919.

LAMAR LYNDON.